United States Patent [19]

Emoto et al.

[11] 4,387,149
[45] Jun. 7, 1983

[54] ELECTROPHOTOGRAPHIC SENSITIVE MATERIAL HAVING A DYE SENSITIZER CONTAINING A CARBONIUM ATOM

[75] Inventors: Kazuhiro Emoto; Kiyoshi Futaki, both of Nagaokakyo, Japan

[73] Assignee: Mitsubishi Paper Mills, Ltd., Tokyo, Japan

[21] Appl. No.: 354,609

[22] Filed: Mar. 4, 1982

Related U.S. Application Data

[63] Continuation of Ser. No. 84,298, Oct. 12, 1979, abandoned.

[30] Foreign Application Priority Data

Oct. 13, 1978 [JP] Japan .................. 53/125965
Dec. 12, 1978 [JP] Japan .................. 53/153859
Dec. 27, 1978 [JP] Japan .................. 53/163094

[51] Int. Cl.³ ........................................... G03G 5/06
[52] U.S. Cl. ................................. 430/83; 430/95
[58] Field of Search .................... 430/82, 83, 90, 91, 430/92, 93, 95

[56] References Cited

U.S. PATENT DOCUMENTS

| | | | |
|---|---|---|---|
| 3,660,086 | 5/1972 | Tamai et al. | 430/91 |
| 3,874,943 | 4/1975 | Watarai et al. | 430/84 |
| 3,881,924 | 5/1975 | Murakami et al. | 430/83 |
| 3,923,507 | 12/1975 | Ohlschlager et al. | 430/92 |
| 4,063,948 | 12/1977 | Lind | 430/83 |

*Primary Examiner*—John E. Kittle
*Assistant Examiner*—John L. Goodrow
*Attorney, Agent, or Firm*—Cushman, Darby & Cushman

[57] ABSTRACT

An electrophotographic photosensitive material in which organic photoconductor is sensitized by a compound represented by the formula,

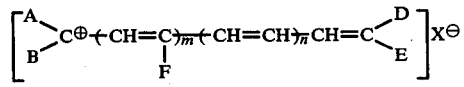

wherein A, B, D and E represent independently a hydrogen atom, an alkyl group having 1 to 4 carbon atoms, a phenyl group or a 5- or 6-membered heterocyclic ring residue, and at least two of them represent a phenyl group; F is an alkyl, phenyl or styryl group; m is a number of 0 or 1, and n is a number of zero, 1 or 2, provided that when m is 1, n is 0; and $X^{\ominus}$ represents an anion residue, has a high sensitivity to the whole range of visible light as well as to the infrared rays of up to around 1,100 nm, and is stable in the potential characteristics such as surface potential and dark damping factor and capable of separation photographing by use of a color separation filter.

8 Claims, No Drawings

ELECTROPHOTOGRAPHIC SENSITIVE MATERIAL HAVING A DYE SENSITIZER CONTAINING A CARBONIUM ATOM

CROSS-REFERENCE TO RELATED APPLICATIONS

This application is a continuation of our earlier application Ser. No. 84,298 filed Oct. 12, 1979 now abandoned.

This invention relates to a high-sensitivity electrophotographic sensitive material principally composed of an organic photoconductor, and more particularly to a dye sensitizer.

There are known many organic compounds that can be used as photoconductor in the photosensitive compositions for electrophotography, and it has been ascertained that some of these compounds possess a fairly high sensitivity. However, there have been reported to date only a few cases of practical use of the organic photoconductors as electrophotographic material. The organic photoconductors have many superior properties to those of the inorganic ones and are possessed of high potentialities of application in the art of electrophotography. For example, production of the transparent photosensitive film, flexible photosensitive film or light-weight and easy-to-treat photosensitive film is impossible without using an organic photoconductor. Also, the film-forming properties in production of photosensitive medium, surface smoothness and selectivity of charging polarity in application to an electrophotographic process can hardly be expected from use of an inorganic photoconductor. Thus, the organic photoconductors have many excellent properties and high potentialities, but nevertheless, they have not been utilized to any significant degree in the art of electrophotography in the past, mostly due to their low photosensitivity.

The study of organic photoconductors has been initially centered on such compounds as low-molecular weight heterocyclic compounds, nitrogenous aromatic compounds and various types of high-molecular weight aromatic compounds, and consequently, there have been worked some compounds which have a fairly high sensitivity. Recently, however, there is a tendency to place the weight on the study of sensitization method for attaining even higher sensitivity of such photoconductive compounds.

This is due to the fact that even the organic semi-photoconductor compounds of highest sensitivity ever known are not possessed of high enough sensitivity to render themselves to immediate practical use with no additional sensitization treatment. Therefore, it is an essential condition for practical use of an organic photoconductor material to properly select and apply the most effective sensitization method, and it may be said that the industrial value of an organic photoconductor material depends on its degree of sensitization that can be ultimately attained by the sensitization means applied.

The most popularly known method of such sensitization is addition of a sensitizing dye and addition of a Lewis acid. This method can be almost unexceptionally applied to all types of organic photoconductors. In the former case, desired sensitization is provided by imparting the spectroabsorptive characteristic of the dye to the organic photoconductor, and in the latter case, new spectrosensitivity is produced by formation of a doner-acceptor complex between the organic photoconductor and the Lewis acid used. However, the degree of sensitization provided to the organic photoconductors by the above-said method is still unsatisfactory for practical use as photosensitive medium for electrophotography.

Listed below are the examples of the compounds (organic photoconductors) for which the dyes of this invention can work effectively:

(I) Aromatic tertiary amino compounds: triphenylamine, dibenzylaniline, diphenylbenzylamine, di-(p-chlorobenzyl)aniline, di-($\beta$-naphthyl)benzylamine, tri-(p-tolyl)amine, diphenylcyclohexylamine, etc.

(II) Aromatic tertiary diamino compounds: N,N,N',N'-tetrabenzyl-p-phenylenediamine, N,N,N',N'-tetra(p-chlorobenzyl)-p-phenylenediamine, N,N,N',N'-tetramethyl-p-phenylenediamine, N,N,N',N'-tetrabenzyl-m-phenylenediamine, N,N,N',N'-tetramethylbenzine, N,N,N',N'-tetraphenyl-p-phenylenediamine, N,N,N',N'-tetraphenyl-m-phenylenediamine, 1,1,-bis-(4-N,N-dibenzylaminophenyl)-ethane, 1,1-bis-(4-N,N-dibenzylaminophenyl)-propane, 1,1-bis-(4-N,N-dibenzylaminophenyl)-butane, 1,1-bis-(N,N-dibenzylaminophenyl)-2-methylpropane, 2,2-bis-(4-N,N-dibenzylaminophenyl)propane, 2,2-bis-(4-N,N-dibenzylaminophenyl)-butane, 1,1-bis[4-N,N-di(m-methylbenzylaminophenyl)]propane, bis-(4-N,N-dibenzylaminophenyl)-methane, bis-[4-N,N-di(p-chlorobenzylaminophenyl)]-methane, bis(4-N,N-dimethylamino)-1,1,1-triphenylethane, 4,4'-benzylidine-bis(N,N-diethyl-m-toluidine), 4',4''-bis(diethylamino)-2,6-dichloro-2',2''-dimethyltriphenylmethane, 4,4''-bis(-dimethylamino)-2-chloro-2',2''-dimethyltriphenylmethane, bis(4-diethylamino)-1,1,1-triphenylethane, 5,5-diphenyl-2,4-pentadienylidene-4,4-bis(N,N-diethyl-m-toluidine) having the following structural formula:

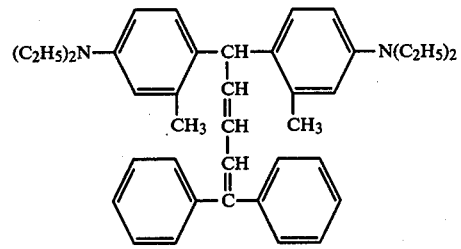

3,3-diphenylallylidine-4,4'-bis(N,N-diethyl-m-toluidine) having the following structural formula:

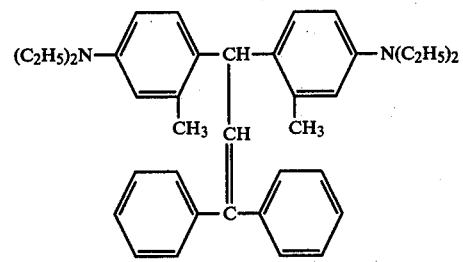

bis-(4-N,N-dibenzylaminophenyl)ether, bis-(4-N,N-dimethylaminophenyl)ether, bis-(4-N,N-dibenzylaminophenyl)thioether, 2,2-bis(di-p-tolyaminophenyl)propane, 4,4'-bis(di-p-tolyamino)-1,1,1-triphenylethane, 4,4-bis(dibenzylaminophenyl)tetraphenylmethane, etc.

(III) Aromatic tertiary triamino compounds: 4,4',4"-tris(diethylaminophenyl)methane, 4-dimethylamino-4',4"-bis(diethylamino)-2',2"-dimethyl-triphenylmethane having the following structural formula:

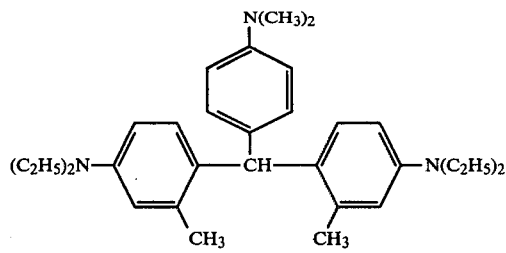

etc.

(IV) Polyvinylcarbazole compounds: polyvinylcarbazole, halogensubstituted polyvinylcarbazole, vinylcarbazole-styrene copolymer, vinylanthracenevinylcarbozole copolymer, etc.

(V) Condensation products: condensation products of aldehyde and aromatic amines, reaction products of tertiary aromatic amines and aromatic halides, poly-p-phenylene-2,3,4-oxadiazole, reaction products of formaldehyde and condensation polycyclic compounds, etc.

(VI) Metal-containing compounds: 2-mercaptobenzothiazole-lead salts, 2-mercapto-benzothiazole-zinc salts 2-mercapto-benzothiazole-copper salts, 2-mercapto-benzoxyazole-lead salts, 2-mercapto-5-phenylbenzoxazole-lead salts, 2-mercapto-6-methoxybenzoimidazole-lead salts, 8-hydroxy-quinolinemagnesium salts, 8-hydroxy-quinone-lead salts, 7-benzyl-8-hydroxy-quinoline copper salts, 2-hydroxy-4-methyl-azobenzene-copper salts, 2-hydroxy-benzole-dimine-zinc salts having the following structural formula:

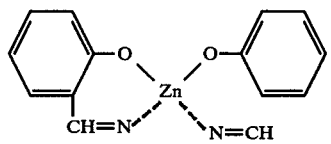

etc.

(VII) Heterocyclic compounds: pyrazoline derivatives such as 1,3,5-triphenyl-pyrazoline, 1-phenyl-3-(p-dimethylaminostyryl)-5-(p-dimethylaminophenyl)-pyrazole, 1,5-diphenyl-3-styryl-pyrazoline, 1,3-diphenyl-5-styryl-pyrazoline, 1,3-diphenyl-5-(p-dimethylaminophenyl)-pyrazoline, 1,3-diphenyl-5-furyl-pyrazoline; 1,2,4-triazine derivatives such as 3-(4'-dimethylaminophenyl)-5,6-di-(4"-methoxyphenyl)-1,2,4-triazine, 3-(4'-dimethylaminophenyl)-5,6-dipyridyl(2")-1,2,4-triadine having the following structural formula:

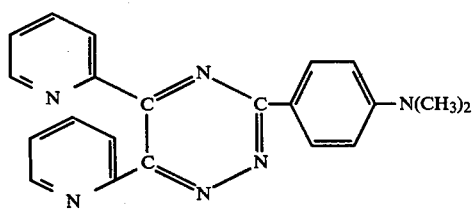

3-(4'-dimethylaminophenyl)-5,6-di-(4"-methoxyphenyl)-1,2,4-triazine, 3-(4'-dimethylaminophenyl)-5,6-di-(4"-methoxyphenyl)-1,2,4-triazine, etc.; quinazoline derivatives such as 2,4-diphenyl-quinazoline, 2-phenyl-4-(4'-tolyl)quinazoline, 2-phenyl-4-(4'-dimethylaminophenyl)-quinazoline having the following structural formula:

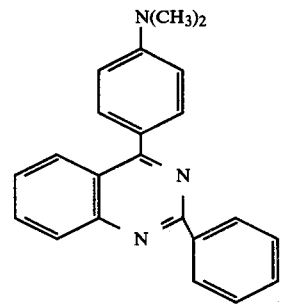

2-phenyl-4-styryl-quinazoline, 2,4-diphenyl-7,8-benzoquinazoline, benzofuran derivatives such as 6-hydroxy-2-phenyl-3-(p-dimethylaminophenyl)-benzofuran having the following structural formula:

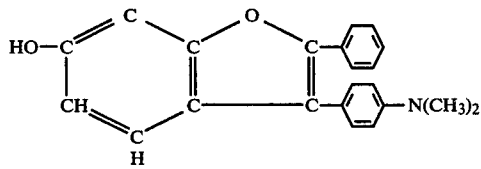

6-hydroxy-2,3-di-(p-methoxyphenyl)-benzofuran, 2,3,5,6-tetra-(p-methoxyphenyl)-furo-(3,2f)-benzofuran, etc.; and oxadiazole derivatives such as 2,5-bis-[4'-dimethylaminophenyl-(1')]-1,3,4-oxadiazole, 2,5-bis-[4'-diethylaminophenyl-(1')]-1,3,4-oxadiazole, 2,5-bis-[4'-isoamylamino-phenyl-(1')]-1,3,4-oxadiazole, 2,5-bis-[4'-cyclo-penteraminophenyl-(1')]-1,3,4-oxadiazole, 2,5-bis-[4'-ethylamino-phenyl-(1')]-1,3,4-oxadiazole, etc.

These organic photoconductors, however, are diversified in character, and some of them may be afforded with a relatively high sensitivity by the conventional sensitization method, while there are those which are little sensitized. Therefore, it is desirable to find out a sensitization method that can be equally applied to all of said organic photoconductors to provide an electrophotographic sensitive material which can well meet the requirements for practical use.

This invention was worked out as a result of many tests and applications of various sensitization methods for various kinds of organic photoconductors to attain the end.

Thus, the first object of this invention is to provide a very excellent organic photoconductor sensitization method and to thereby provide a sensitizer that has high sensitizing performance and can be commercialized as an electrophotographic sensitive material.

The second object of this invention is to provide a high-sensitivity photosensitive film that can well meet the conditions for practical applications and may, for example, be industrially used as a transparent photosensitive film, flexible photosensitive film or light-weight and easy-to-treat photosensitive film.

The third object of this invention is to provide a photosensitive material having high sensitivity to the whole range of visible light as well as to the infrared rays of up to around 1,100 nm.

The fourth object of this invention is to provide a color electrophotographic photosensitive material which allows separation photographing by use of a color separation filter.

The fifth object of this invention is to provide a stabilized photosensitive material of which the potential characteristics such as surface potential and dark damping factor won't be affected by addition of a sensitizing dye.

The above objects of this invention are accomplished by providing an electrophotographic photosensitive material comprising substantially at least one organic photoconductor and at least one of the compounds of the following general formula (I) on a support.

General formula (I):

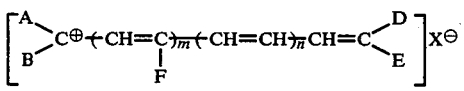

In the above formula (I), A, B, D and E represent independently a hydrogen atom, an alkyl group having 1 to 4 carbon atoms, a phenyl group or a 5- or 6-membered heterocyclic residue, and at least two of them represent a phenyl group; F is an alkyl, phenyl or styryl group; m is a number of 0 or 1, and n is a number of 0, 1 or 2, provided that when m is 1, n is 0; $X^{\ominus}$ represents an anion residue.

The compounds of the above formula (I) include, as preferred examples, those represented by the following general formula (II):

General formula (II):

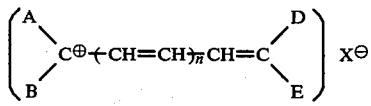

In the above formula (II), A, B, D, E, n and $X^{\ominus}$ are as defined above, and at least two of A, B, D and E represent a phenyl group. Such phenyl group includes those substituted with an alkyl group, an alkoxy group, a halogen atom, a nitro group or, preferably, a

group (where $R_3$ and $R_4$ represent respectively hydrogen atom, an alkyl group, a benzyl group or such).

Most preferred among the compounds of the formula (II) are those represented by the following general formulae (III) and (IV):

General formula (III):

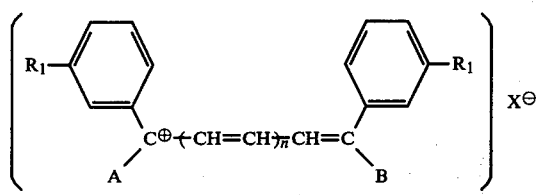

General formula (IV):

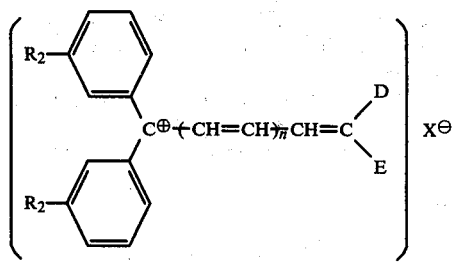

In the above formulae (III) and (IV), $R_1$ and $R_2$ represent hydrogen, methoxy, ethoxy or

(wherein $R_3$ and $R_4$ represent methyl, ethyl or benzyl (including substituted benzyl), A, B, D and E represent phenyl (including substituted phenyl), methyl or ethyl, n is an integer of 1 or 2, and $X^{\ominus}$ represents an anion residue.

The compounds of the formula (II) include those represented by the following general formula (V):

General formula (V):

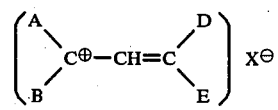

In the above formula (V), A, B, D, E and $X^{\ominus}$ are defined same as in the formula (I), and at least two of A, B, D and E represent a phenyl group. Such phenyl group may have a substituent such as mentioned in the definition of the formula (II).

The 5- or 6-membered heterocyclic residue in the formula (I) includes furyl, pyridyl, thienyl, indolyl and pyrol groups.

Another group of compounds included in the definition of the formula (I) are represented by the following general formula (VI):

General formula (VI):

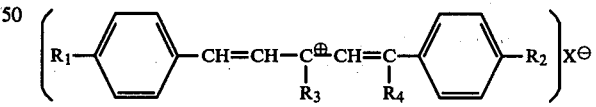

In the above formula (VI), $R_1$ and $R_2$ represent hydrogen, $-OR_5$ ($R_5$ is alkyl), halogen,

($R_6$ and $R_7$ represent hydrogen, alkyl or benzyl (including substituted benzyl)), $R_3$ represents hydrogen, alkyl, phenyl (including substituted phenyl) or styryl (including substituted styryl), and $X^{\ominus}$ represents an anion residue.

Although use of said polymethine dyes as organic photoconductor sensitizer for electrophotography was proposed for the first time in this invention, the syntheses of such dyes have already been reported in the prior literatures, e.g., Bernard S. Wildi et al: J. Am. Chem. Soc., 80, 3772–3777 (1958), R. Wizinger et al: Helv. Chim. Acta, 24, 369E, and H. Schmidt et al: Ann., 623 204–216 (1956).

Listed below are the typical examples of the compounds represented by the above-shown general formula (I) which are usable in the composition of this invention:

Compound No. 1:
1,1,5,5-tetrakis-(p-dimethylaminophenyl)-divinylylenecarbonium-perchlorate

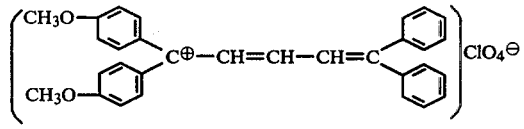

Compound No. 4:
1,1,5,5-tetrakis-anisil-divinylylene-carbonium-perchlorate

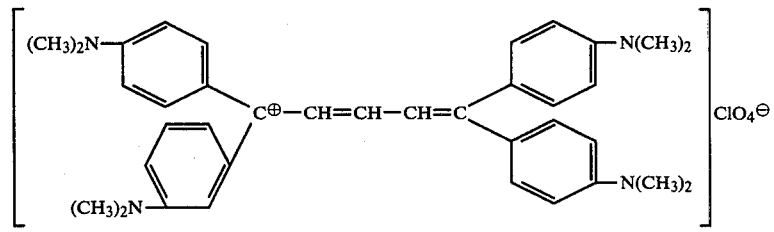

Compound No. 2:
1,1-bis-(p-dimethylaminophenyl)-5,5-bisphenyl-divinylylenecarbonium perchlorate

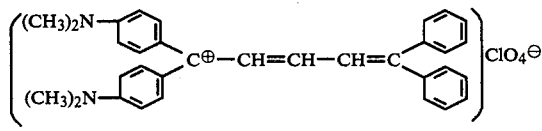

Compound No. 5:
1,5-bis-(p-dimethylaminophenyl)-1,5-bisphenyl-divinylylenecarbonium perchlorate

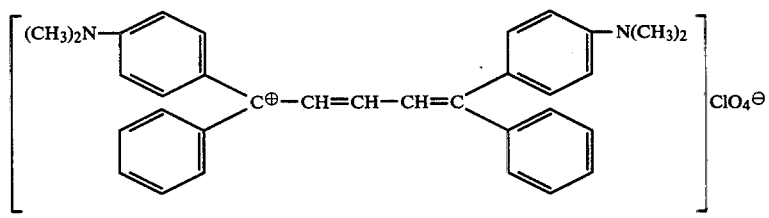

Compound No. 6:
1,1-bis-(p-dimethylaminophenyl)-5-(p-dimethylaminophenyl)-5-phenyl-divinylylene-carbonium perchorate Compound No. 3:
1,1-bisanisil-5,5-bisphenyl-divinylylenecarbonium-perchlorate

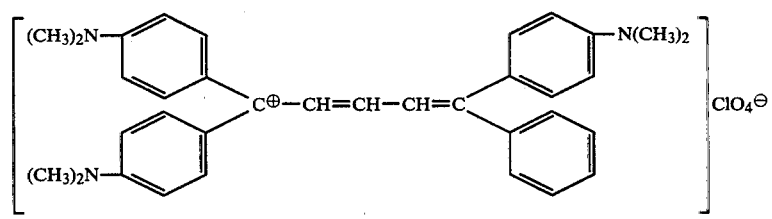

Compound No. 7:
1,1-bis-(p-dimethylaminophenyl)-5,5-bisanisildivinylylene-carbonium perchlorate

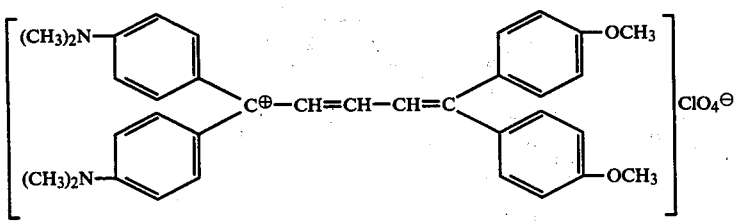

Compound No. 8:
1-(p-dimethylaminophenyl)-5-anisil-1,5-bisphenyl-divinylylenecarbonium perchlorate

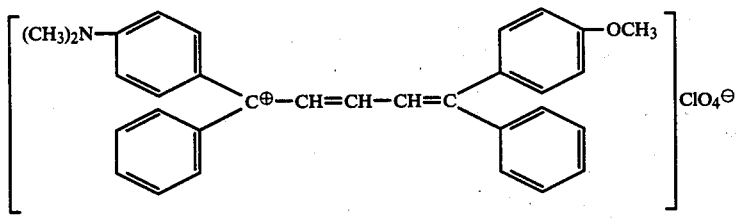

Compound No. 9:
1,1-bis-(p-dimethylaminophenyl)-5,5-bis-(p-chlorophenyl)-divinylylene-carbonium-perchlorate

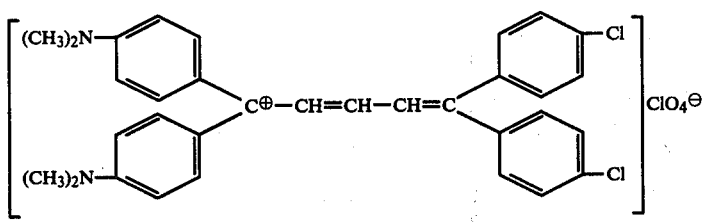

Compound No. 10:

1,1,5,5-tetrakis-(p-aminophenyl)-divinylylene-carbonium-perchlorate

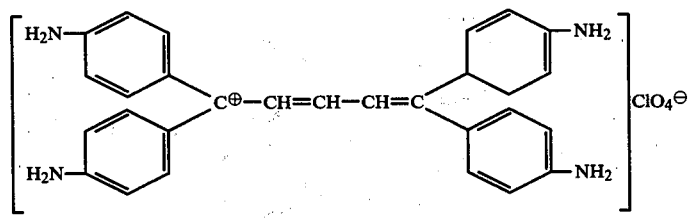

Compound No. 11:

1,1,5,5-tetrakis-(p-diethylaminophenyl)-divinylylenecarbonium-perchlorate

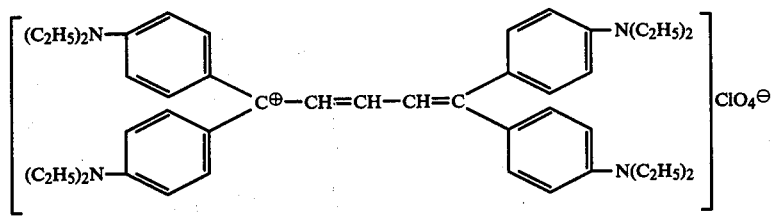

Compound No. 12:

1,5-bis-(p-dibenzylaminophenyl)-1,5-bisphenyldivinylylene-carbonium perchlorate

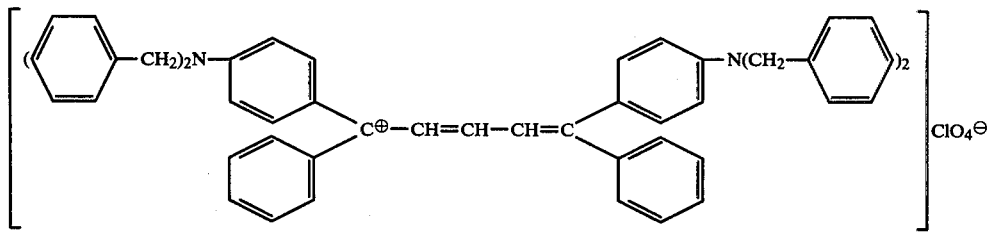

Compound No. 13:
1,1,5,5-tetrakis-(p-dimethylaminophenyl)-

1,1,5,5-tetrakis-[p-di-(p-chlorobenzylaminophenyl)-]divinylylene-carbonium-perchlorate

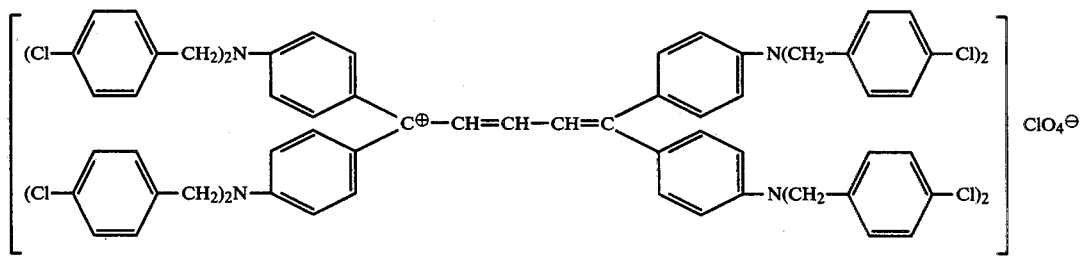

divinylylenecarbonium-chloride

Compound No. 16:

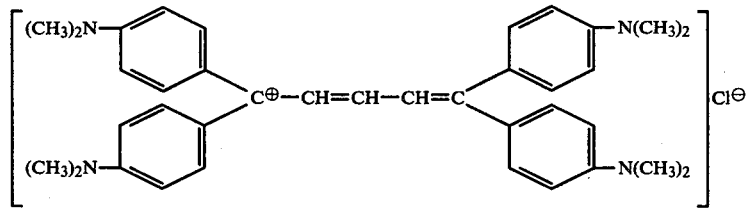

Compound No. 14:
1,5-bis-(p-chlorophenyl)-1,5-bis(p-dimethylamino- 1,1,5,5-tetrakis-(p-dimethylaminophenyl)-divinylylenecarbonium-fluorophosphate

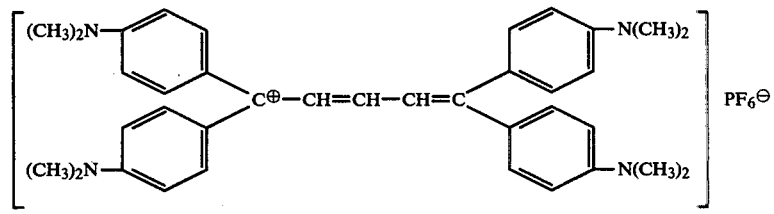

phenyl)-carbonium-perchlorate

Compound No. 17:

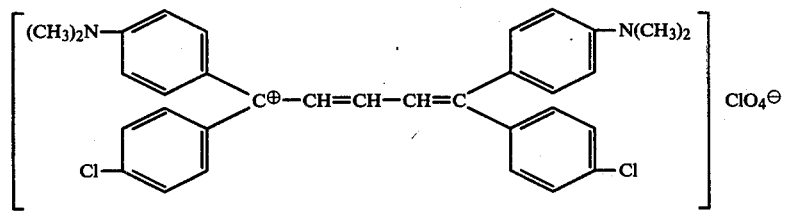

Compound No. 15:

1,5-bis-(p-diethylaminophenyl)-1,5-bis-phenyldivinylylene-carbonium perchlorate

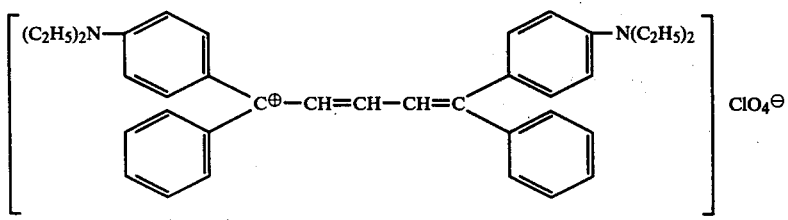

Compound No. 18:
1,7-bis-(p-dimethylaminophenyl)-1,7-bis-phenyltrivinylene-carbonium-perchlorate

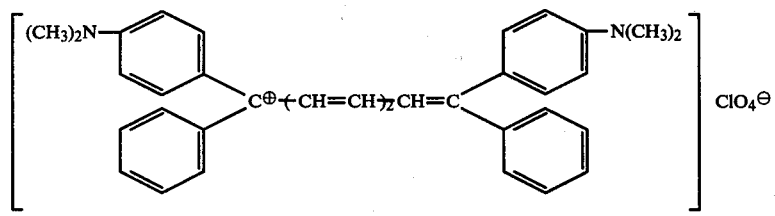

Compound No. 19:
1,7-bis-(p-dimethylaminophenyl)-1,7-bis-anisiltrivinylylene-carbonium-perchlorate Compound No. 20:
1,7-bis-(p-dimethylaminophenyl)-1,7-bis-(p-chlorophenyl)-trivinylylene-carbonium-perchlorate

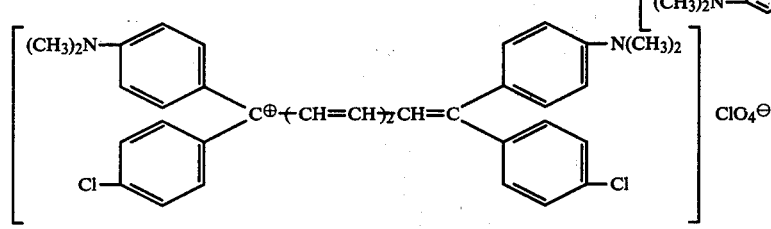

Compound No. 21:
1,1,7,7-tetrakis-(p-dimethylaminophenyl)-trivinylene-carbonium-perchlorate

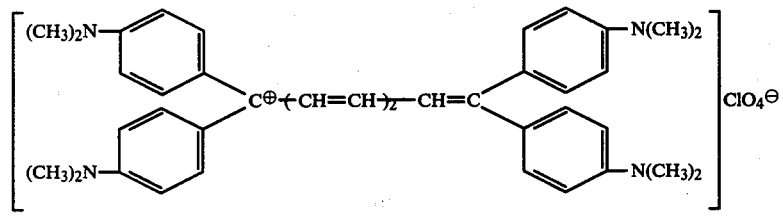

Compound No. 22:
1,7-bis-(p-dimethylaminophenyl)-1,7-bis-(2,4-dichlorophenyl)-trivinylylene-carbonium perchlorate

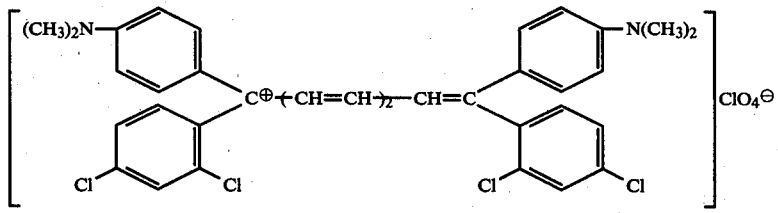

Compound No. 23:
1,1-bis-(p-dimethylaminophenyl)-5-methyl-5-phenyl-divinylylene-carbonium-perchlorate

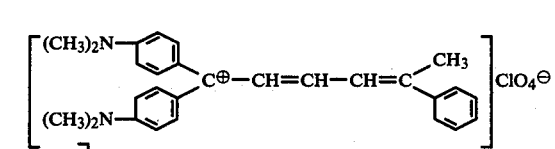

Compound No. 24:

1,5-bis-(p-dimethylaminophenyl)-1,5-dimethyldivinylylene-carbonium-perchlorate

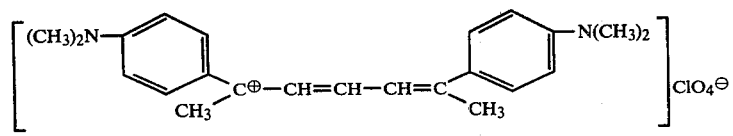

Compound No. 25:
1,1-bis-(p-dimethylaminophenyl)-5-ethyl-5-(p-chlorophenyl)-divinylylene-carbonium-perchlorate

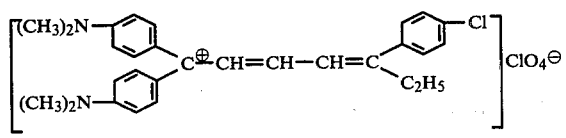

Compound No. 26:
1,5-bis-(p-dimethylaminophenyl)-1,5-bis-(2'-furyl)divinylylene-carbonium-perchlorate

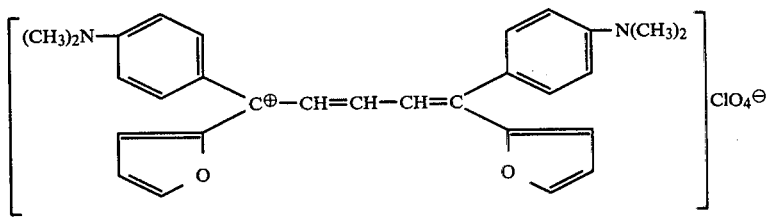

Compound No. 27:
1,1,3,3-tetrakis-(p-dimethylaminophenyl)-vinylylene-carbonium-perchlorate

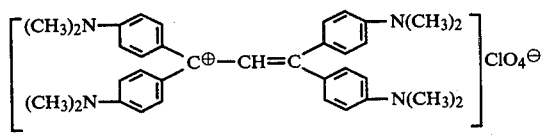

Compound No. 28:
1,1-bis-(p-dimethylaminophenyl)-3,3-bisphenylvinylylene-carbonium-perchlorate

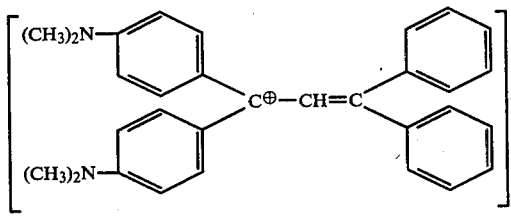

Compound No. 29:
1,1-bis-(p-dimethylaminophenyl)-3,3-bis-(p-methoxyphenyl)-vinylylene-carbonium-perchlorate

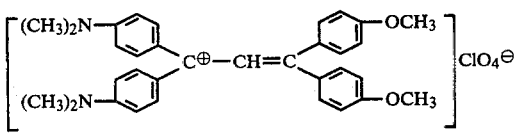

Compound No. 30:
1,3-bis-(p-dimethylaminophenyl)-1-phenyl-vinylylenecarbonium-perchlorate

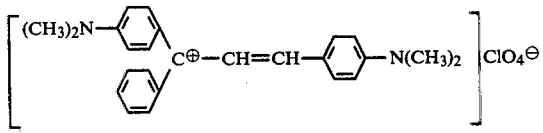

Compound No. 31:
1,1-bis-(p-dimethylaminophenyl)-3-(2-furyl)vinylylene-carbonium-perchlorate

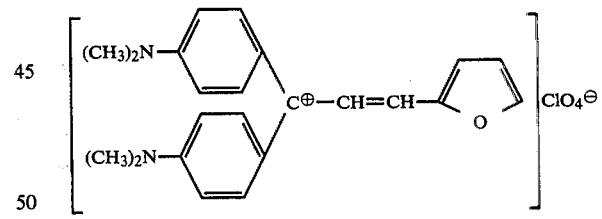

Compound No. 32:
1,1-bis-(p-dimethylaminophenyl)-3-phenylvinylylene-carbonium-perchlorate

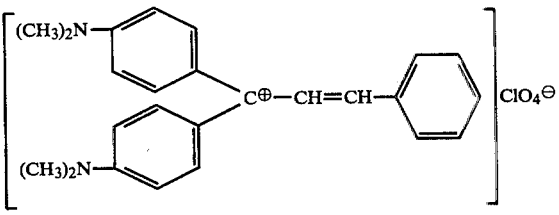

Compound No. 33:
1,1,3-tris-(p-dimethylaminophenyl)-vinylylene-carbonium-perchlorate

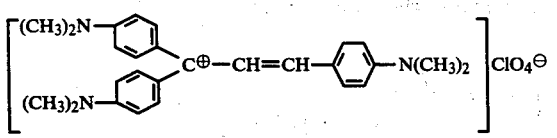

Compound No. 34:
1,3-bis-(p-dimethylaminophenyl)-1,3-dimethylvinylene-carbonium-perchlorate

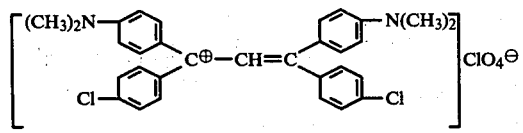

Compound No. 38:
1,1,3-tris-(p-dimethylaminophenyl)-3-phenylvinylene-carbonium-perchlorate

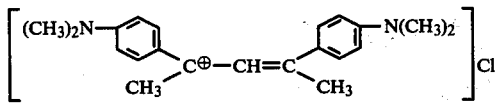

Compound No. 35:
1,1-bis-(p-methoxyphenyl)-3-(p-dimethylaminophenyl)vinylylene-carbonium-perchlorate

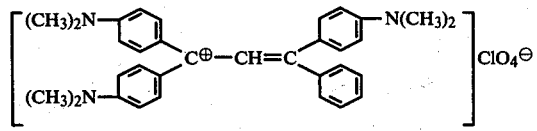

Compound No. 39:
1-(p-dimethylaminophenyl)-3-(p-diethylaminophenyl)-1,3-bis-phenyl-vinylylene-carbonium-p-toluenesulfonate

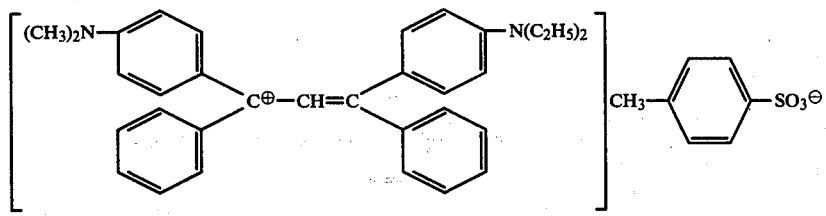

Compound No. 40:
1,1-bis-(p-dimethylaminophenyl)-3-[p-di(benzyl)-aminophenyl]-vinylylene-carbonium-perchlorate

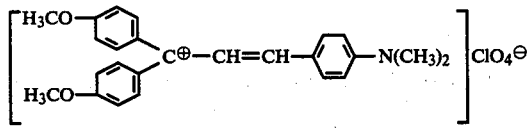

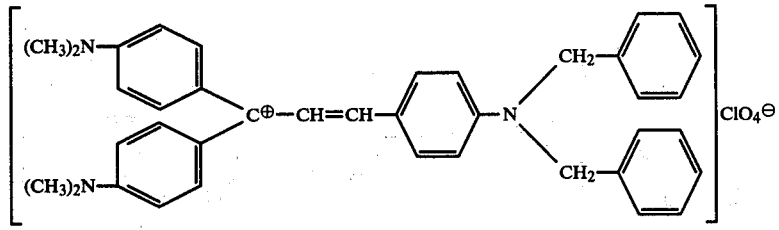

Compound No. 41:
1,1-bis-(p-dimethylaminophenyl)-3-(n-butyl)-3-phenyl-vinylylene-carbonium-perchlorate Compound No. 36:
1,3-bis-p-dimethylaminophenyl-1,3-bis-phenyl-vinylylene-carbonium-perchlorate

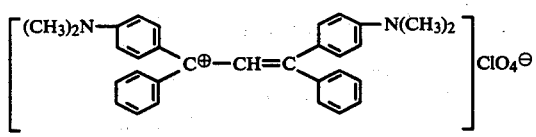

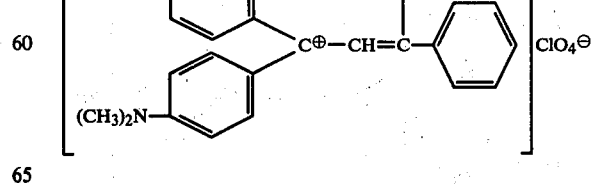

Compound No. 37:
1,3-bis-(p-dimethylaminophenyl)-1,3-bis-(p-chlorophenyl)-vinylene-carbonium-perchlorate Compound No. 42:
1,1-bis-(p-dimethylaminophenyl)-3-methyl-3-(p-ethoxyphenyl)vinylylene-carbonium-perchlorate

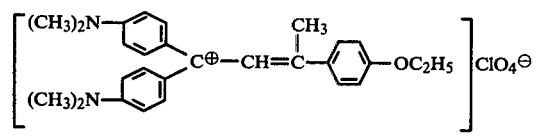

Compound No. 43:
Bis-[1,1-bis-(p-dimethylaminophenyl)-vinylylenecarbonium]-phenylene-diperchlorate

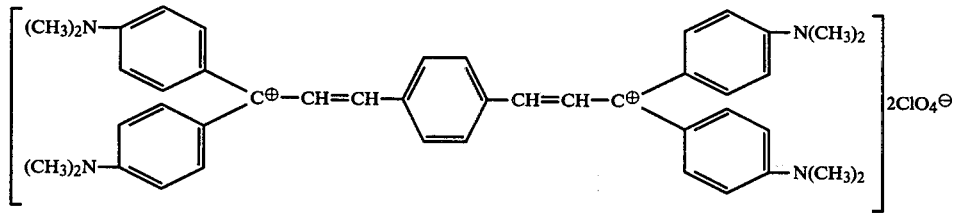

Compound No. 44:
1,1-bis-(p-dimethylaminophenyl)-3-(p-diethylaminophenyl)-vinylylene-carbonium-trichloacetate

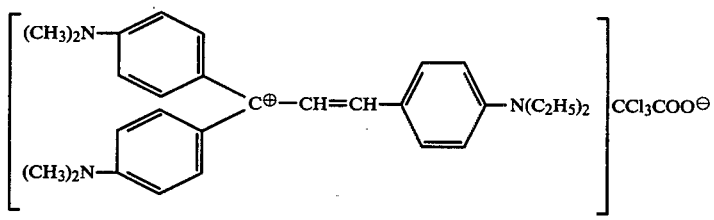

Compound No. 45:
1,1-bis-(p-dimethylaminophenyl)-3-[p-di(4-chlorobenzyl)-aminophenyl]-vinylylene-carbonium-perchlorate

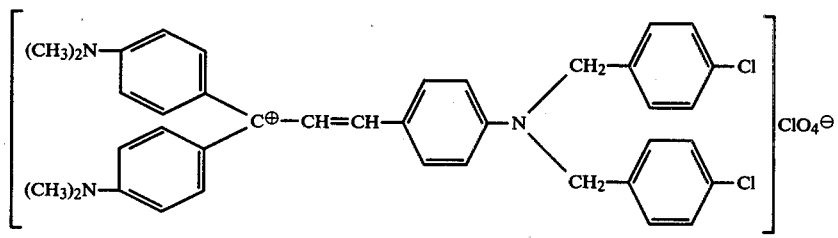

Compound No. 46:
1,1-bis-(p-dimethylaminophenyl)-3-(2-thienyl)vinylylene-carbonium-perchlorate

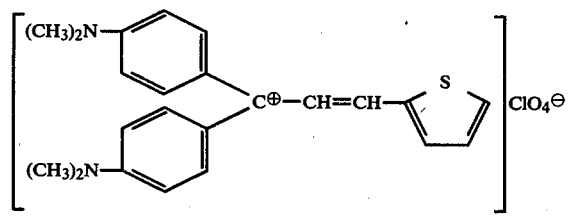

Compound No. 47:

1,3-bis-(p-dimethylaminophenyl)-1-(p-chlorophenyl)-vinylylene-carbonium-perchlorate

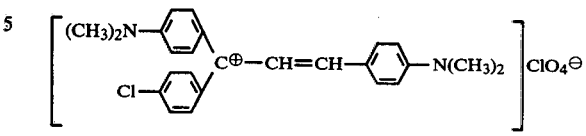

Compound No. 48:

1,3-bis-(p-dimethylaminophenyl)-vinylylene-carbonium-perchlorate

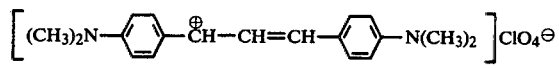

Compound No. 49:
1,1-bis-phenyl-3-(p-dimethylaminophenyl)-vinylylene-carbonium-perchlorate

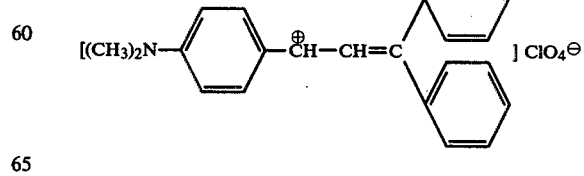

Compound No. 50:
1,5-bis-(p-dimethylaminophenyl)-divinylylene-carbonium-perchlorate

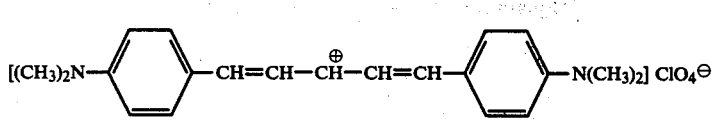

Compound No. 51:
1,5-bis-(p-dimethylaminophenyl)-1-phenyl-divinyly-lene-carbonium-perchlorate

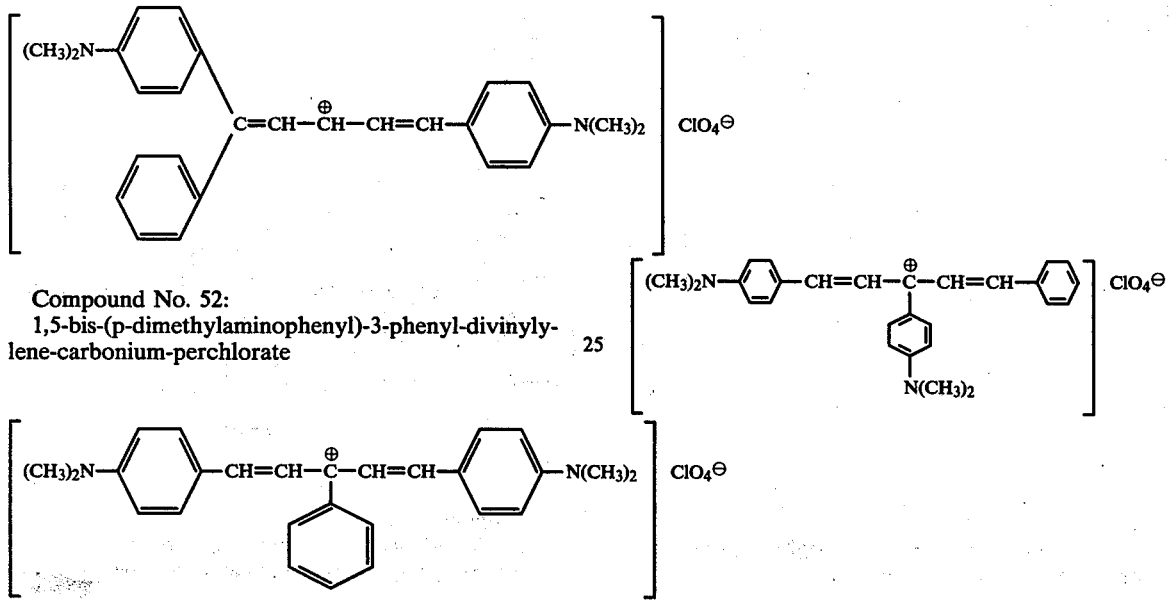

Compound No. 52:
1,5-bis-(p-dimethylaminophenyl)-3-phenyl-divinyly-lene-carbonium-perchlorate Compound No. 53:
1,3-bis-(p-dimethylaminophenyl)-5-phenyl-divinyly-lene-carbonium-perchlorate Compound No. 54:
1,5-bis-(p-dimethylaminophenyl)-3-styryl-divinyly-lene-carbonium-perchlorate

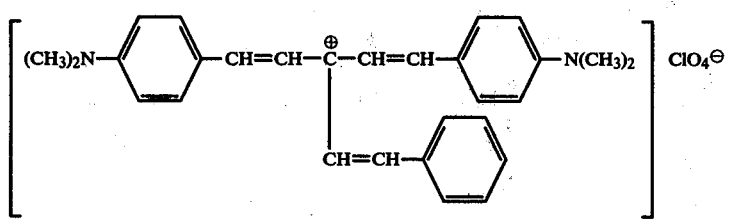

Compound No. 55:
1,3,5-tris-(p-dimethylaminophenyl)-divinylylene-carbonium-perchlorate

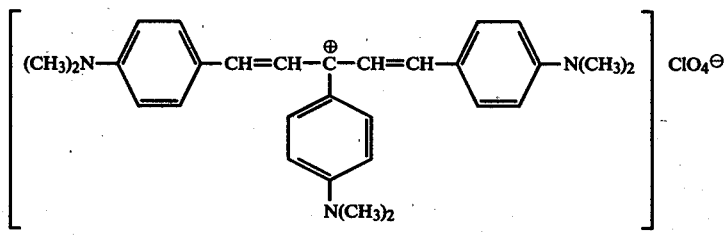

Compound No. 56:

23

1,1,5-tris-(p-dimethylaminophenyl)-divinylylene-carbonium-perchlorate

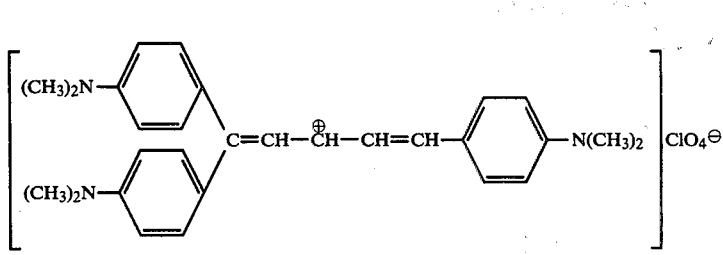

Compound No. 57:
1,1,3,5-tetrakis-(p-dimethylaminophenyl)-divinyllyene-carbonium-perchlorate

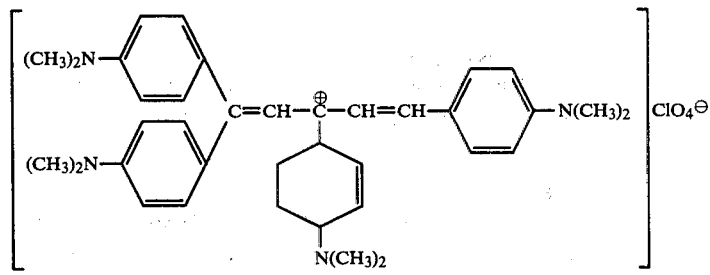

Compound No. 58:

24

1,1,5-tris-(p-dimethylaminophenyl)-3-(p-dimethylaminostyryl)-divinylylene-carbonium-perchlorate

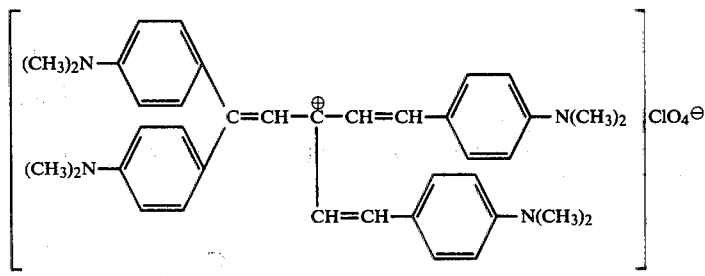

Compound No. 59:
1,5-bis-(p-dimethylaminophenyl)-3-(p-dimethylaminostyryl)-divinylylene-carbonium-perchlorate

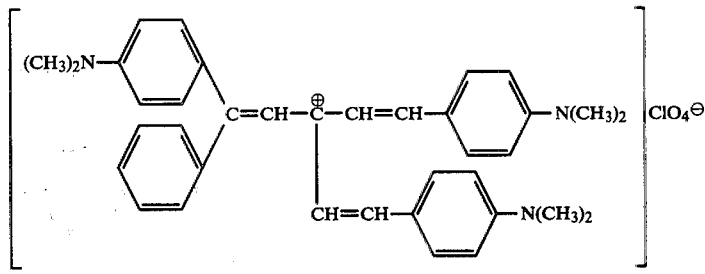

Compound No. 60:
1,5-bis-(p-dimethylaminophenyl)-1-(p-chlorophenyl)-3-phenyl-divinylylene-carbonium-perchlorate

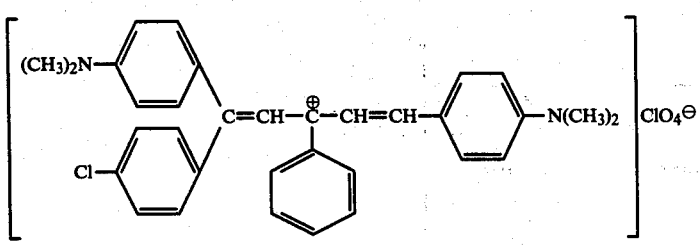

Compound No. 61:
1,1,5-tris-(p-dimethylaminophenyl)-divinylylene-carbonium-perchlorate 1,1,5-tris-(p-dimethylaminophenyl)-3-(p-chlorophenyl)-divinylylene-carbonium-perchlorate

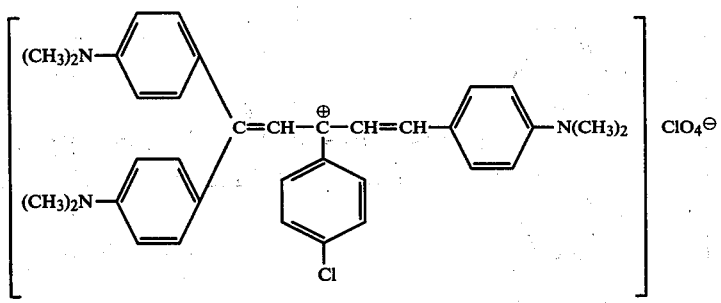

Compound No. 64:

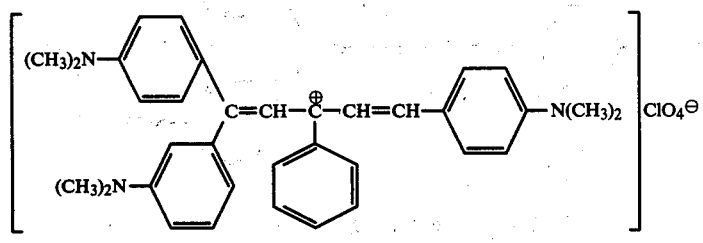

Compound No. 62:
1,5-bis-(p-dimethylaminophenyl)-1-methyl-divinylylene-carbonium-perchlorate 1,5-(p-dimethylaminophenyl)-3-ethyl-divinylylene-carbonium-perchlorate

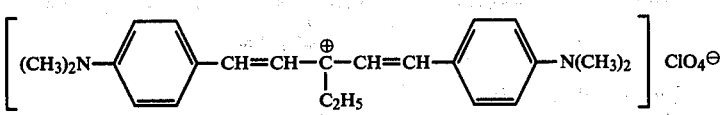

Compound No. 65:

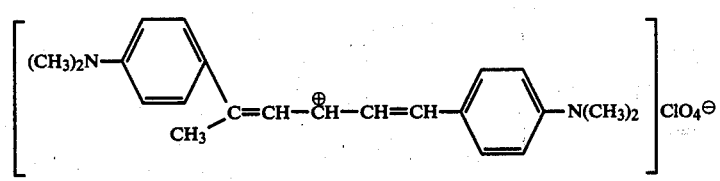

Compound No. 63:

1-(p-dimethylaminophenyl)-1-phenyl-3-ethyl-5-(p-dibenzylaminophenyl)-divinylylene-carbonium-perchlorate

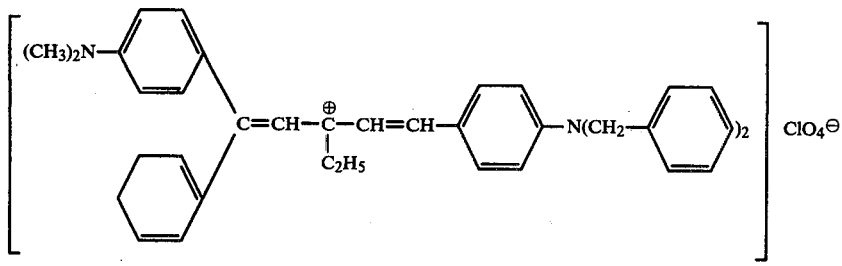

Compound No. 66:
1,1,5-tris-(p-dimethylaminophenyl)-3-methyl-divinylylene-carbonium-perchlorate

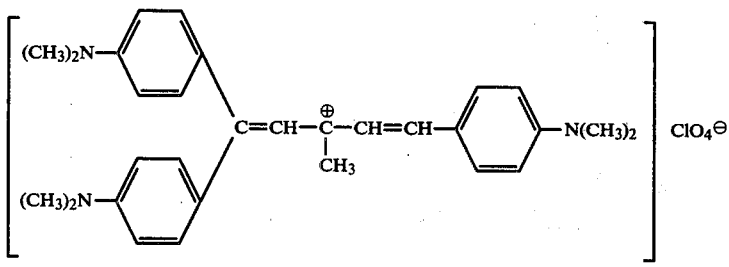

Compound No. 67:
1,5-bis-(p-dimethylaminophenyl)-1,3-dimethyl-divinylylene-carbonium-perchlorate

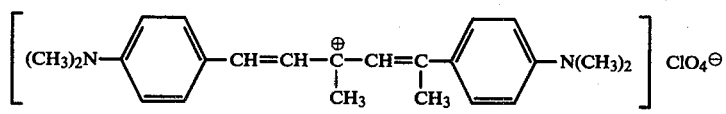

Compound No. 68:
1,5-bis-(p-dimethylaminophenyl)-1-(2,4-dichlorophenyl)-divinylylene-carbonium-perchlorate Compound No. 69:
1,1-bis-(p-dimethylaminophenyl)-5-(p-ethoxyphenyl)-divinylylene-carbonium-perchlorate

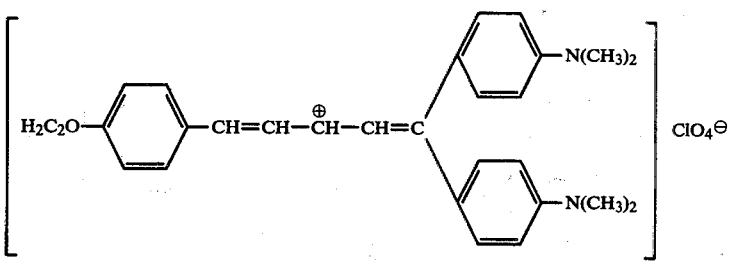

Compound No. 70:
1,1,5-tris-(p-methoxyphenyl)-3-(p-methoxystyryl)-divinylylene-carbonium-perchlorate

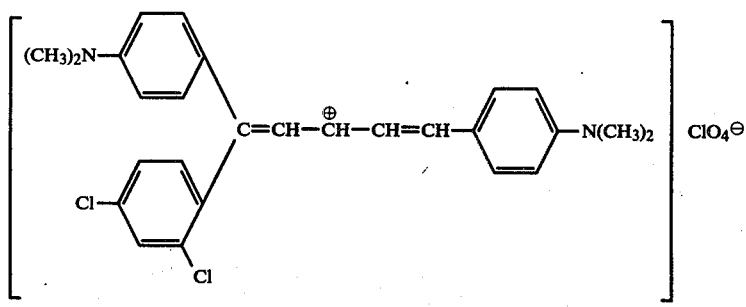

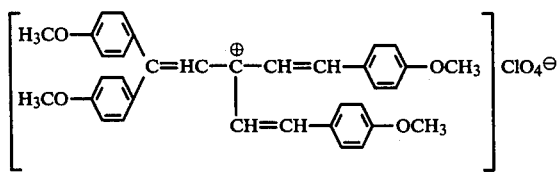

Compound No. 71:
1,5-bis-(p-dimethylaminophenyl)-divinylylene-carbonium-trifluoroacetate

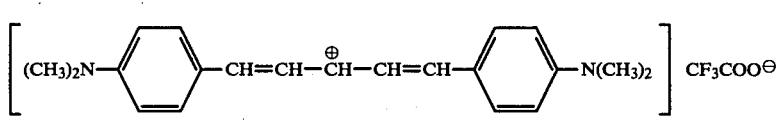

Compound No. 72:
1,5-bis-(p-dimethylaminophenyl)-3-phenyl-divinylylene-carbonium-p-toluenesulfonate

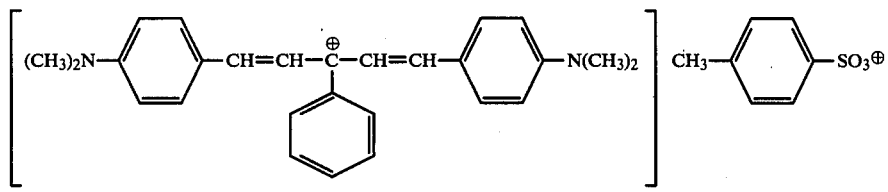

The polymethine dyes according to this invention have a very high sensitizing action on all types of organic photoconductors including the aforementioned aromatic tertiary amino compounds, aromatic tertiary diamino compounds, aromatic tertiary triamino compounds, polyvinyl carbazole compounds, condensation products, metal-containing compounds and heterocyclic compounds, and their sphere of sensitization spans the whole range of visible wavelength. It was also found that some types of said dyes show even a higher degree of responsiveness to the infrared range than to the visible wavelength range.

The amount of the polymethine dye added varies depending on the purpose of use, but usually it is within the range of 0.001 to 10 parts per 100 parts of the organic photoconductor.

The photosensitive composition for electrophotography according to this invention can be obtained in the following way: an organic photoconductor such as mentioned above, a polymethine dye of this invention and where necessary a film-forming binder, other kind of dye, a sensitizer typified by a Lewis acid compound which is a chemical sensitizer, a plasticizer, a retouching agent, a toner fixer, etc., are dissolved or dispersed in a solvent, and this solution or dispersion is applied on a suitable support and dried, or the said components are melted together and applied on a support.

An electrophotographic photosensitive material with particularly high sensitivity can be obtained when a polymethine dye used in this invention is dissolved or dispersed in water or an organic solvent such as mentioned later by means of a ball mill, homogenizer or supersonic homoginizer to form a finely particles for use as if pigment to let it serve as a charge carrier producing material while using in combination therewith an organic photoconductor such as above-mentioned, preferably, for example, an aromatic tertiary diamino compound or pyrazoline compound, as a charge transfer material. In this case, both of said dye and organic photoconductor may be allowed to exist in a same layer. However, the sensitivity more increases when two layers are provided of which upper layer is of the organic photoconductor and the lower layer is of the dye.

Beside the said polymethine dyes, the composition may contain other known sensitizing dyes, for example, triphenylmethane dyes such as Victoria Blue B, Helvetica Green, Patent Blue V, Brilliant Light Blue, Ethyl Green, Malachite Green, Crystal Violet, etc., diphenylmethane dyes such as Auramine G. Auramine O, etc., xanthene dyes such as Rhodamine B, Rohdamine G, Xylene Blue VS, Xylene Red B, Acridine Red 3B, Pyronine G, etc., azine dyes such as Methylene Violet BN, Indamine Blue B, etc., pyrylium or thiapyrylium dyes such as 2-(4'-dimethylaminophenyl)-7-hydroxy-benzopyrylium-perchlorate, 2-(4'-dimethylaminophenyl)-benzopyrylium-perchlorate, 2-dimethylaminophenyl-4,6-diphenyl-pyrylium perchlorate, 2,4,6-tri(dimethylaminophenyl)-pyrylium perchlorate, 2,6-di(4-dimethylaminostyryl)-4-phenylbenzopyrylium perchlorate having the following structural formula:

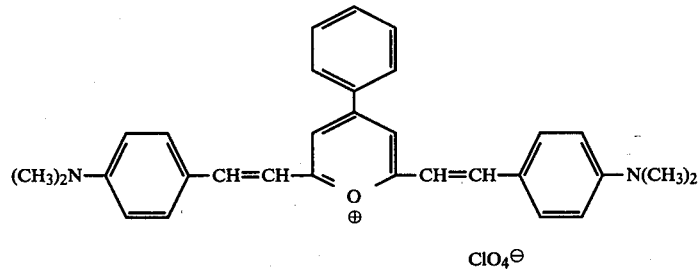

2-(β-dimethylaminophenyl-β-phenyl-vinyl)-4,6-diphenyl-pyrylium perchlorate having the following structural formula:

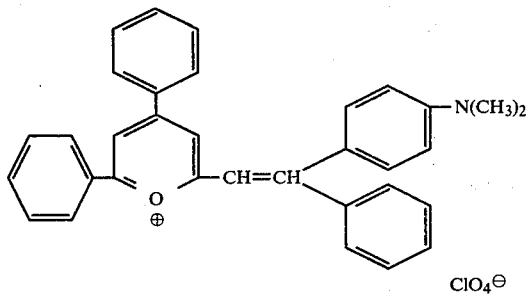

2,4,6-tri(dimethylaminophenyl)-thiapyrylium-perchlorate, etc. The composition may also contain the following compounds as chemical sensitizer: p-nitrophenol, p-nitrobenzoic acid, 4-chloro-3,5-dimethylphenol, 4-hydroxy-3-bromo-biphenylbis(5-chloro-2-hydroxyphenyl)methane, N,N'-diethyl-2-thiobarbituric acid, N,N'-dimethylbarbituric acid, N-(n-butyl)-N'-(p-chlorophenyl)barbituric acid, 3-chlorobenzoylacetoanilide, 3,5-dichlorobenzoylaceto-(3',5'-dichloroanilide), malondianilide, tetracyanoquinodimethane, picric acid, etc. Even when the organic photoconductor itself has the film-forming properties (such as for example polyvinylcarbazole), it is actually necessitated to add a film-forming binder.

The film-forming binder used in this invention is preferably of the type which has high insulating performance and is capable of providing high film surface strength. Examples of such binder are polystyrene, styrene-butadiene copolymer, silicon resin, styrenated alkyd resin, polyphenylene oxide resin, phenoxy resin, diallyl phthalate resin, polysulfon resin, polycarbonate resin and xylene resin.

The solvent used for forming a coating composition by using a sensitizing dye of this invention may be selected from a wide variety of organic solvents generally employed as coating composition component. Examples of such solvents are benzene, toluene, xylene, monochlorobenzene, dioxane, dichloroethane and methyl ethyl ketone. A mixture of such solvents can be used advantageously in the preparation of the composition of this invention.

The polymethine dyes of this invention are sparingly soluble in said solvents, so that addition of an assistant solvent is necessitated for properly dissolving the dye. Usable as such assistant solvent in this invention are, for example, ethylalcohol, methylformamide, acetylacetone and dimethyl sulfoxide.

A wide variety of electroconductive support materials may be used as support for the photosensitive layer in this invention. For example, there may be used paper which has been subjected to an electro-conductive treatment, aluminum laminated paper, aluminum foil, zinc foil, or a metal layer formed by depositing silver, nickel, copper iodide or the like on a usual support such as a polyvinyl acetate film or polystyrene film, or other similar electroconductive supports.

The invention is now described in further detail by way of the example thereof, but it goes without saying that this invention is not limited by these examples.

EXAMPLE 1

One gr of polycarbonate resin (IUPILON N-3, mfd. by Mitsubishi Gas Chemistry), 1 gr of bis-(4-N,N-dibenzylaminophenyl)-methane and 0.1 gr of N,N'-diethyl-2-thiobarbituric acid were dissolved in 10 cc of monochlorobenzene, and to this solution was added $1.5 \times 10^{-6}$ mol of polymethine dyes of the below-shown general formula dissolved in acetoacetone, thereby preparing sensitizing solutions.

Each of these sensitizing solutions was applied on a polyvinyl alcohol-treated fine paper by using a wire round rod and dried to obtain a sensitive paper having an approximately 6μ thick sensitive layer.

This sensitive paper, after moisture adjustment, was charged and exposed by using an electrostatic copying paper tester (by Kawaguchi Electrics), and the initial potential and the exposure required for reducing the initial potential to half were measured and shown in Table 1. The reflection spectrum of this sensitive paper was also measured and its peak was determined and shown in Table 1.

In this example, there were used five polymethine dye samples having the below-shown general formula but differring in $R_1$ and $R_2$ from one another.

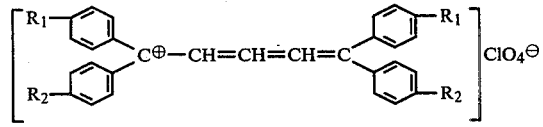

TABLE 1-(1)

| Dye No. | $R_1$ | $R_2$ | $\lambda_{max}$ (Note 1) | Melting point (°C.) |
|---|---|---|---|---|
| 1 | —N(CH₃)₂ | —N(CH₃)₂ | 804 | 245–247 |
| 2 | —N(CH₃)₂ | H | 832 | 210–211 |
| 3 | —N(CH₃)₂ | Cl | 845 | 217–218 |
| 4 | —N(C₂H₅)₂ | H | 833 | 219–220 |
| 5 | —OCH₃ | —OCH₃ | 712 | 172–173 |

TABLE 1-(2)

| Dye No. | $R_1$ | $R_2$ | Initial potential (v) | Photosensitivity (Note 2) | Reflection peak (Note 3) | Color of sensitive paper |
|---|---|---|---|---|---|---|
| 1 | —N(CH₃)₂ | —N(CH₃)₂ | 850 | 5.8 | 816 | White |
| 2 | —N(CH₃)₂ | H | 840 | 5.0 | 842 | White |
| 3 | —N(CH₃)₂ | Cl | 850 | 5.2 | 851 | White |
| 4 | —N(C₂H₅)₂ | H | 845 | 5.1 | 840 | White |
| 5 | —OCH₃ | —OCH₃ | 855 | 8.3 | 723 | Light green |

(Note 1): Maximum value of spectroabsorption (nm) in the ethanol solution.
(Note 2): Exposure (lux/sec) required for reducing the initial potential to half.
(Note 3): Maximum value on reflection spectrum of the sensitive paper.

By way of comparison, a similar test was conducted by adding the same molar quantity of Crystal Violet (having the below-shown structural formula) instead of the dyes of this invention, and the following results were obtained.

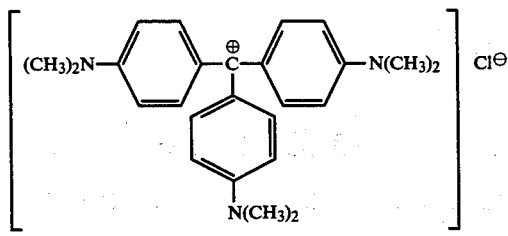

Initial potential: 850 (V)
Photosensitivity: 25 (lux/sec)
Reflection peak: 610 (nm)
Color of sensitive paper: dark blue The results of Table 1 and the comparative example indicate that the sensitizing dyes of this invention have very excellent sensitizability and scarcely cause tinting of the sensitized layer surface.

EXAMPLE 2

One gr of polystyrene resin (DIALEX HH-102 by Mitsubishi Monsanto), 1 gr of 1,3,5-triphenylpyrazoline and 0.12 gr of 3,5-dichlorobenzoylaceto-3',5'-dichloroanilide were dissolved in 12 cc of toluene, and to this solution was added $1.5 \times 10^{-6}$ moles of polymethine dyes of the following general formula dissolved in acetoacetone, thereby preparing the sensitizing solutions.

Then the sensitive papers having an approximately 6.3 thick sensitive layer were obtained in the completely same way as Example 1 and their properties were measured after the manner of Example 1, obtaining the results shown in Table 2.

As polymethine dye samples, there were used three compounds having the following general formula but differing in $R_1$ and $R_2$ from each other.

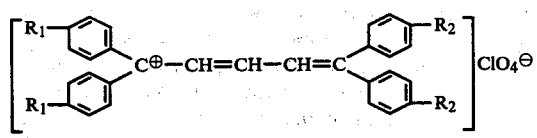

TABLE 2-(2)

| Dye No. | $R_1$ | $R_2$ | $\lambda_{max}$ (Note 1) | Melting point (°C.) |
|---|---|---|---|---|
| 6 | —N(CH$_3$)$_2$ | H | 824 | 167–168 |
| 7 | —N(CH$_3$)$_2$ | —OCH$_3$ | 782 | 230–231 |
| 8 | —N(CH$_3$)$_2$ | Cl | 836 | 215–218 |

| Dye No. | Initial potential (V) | Photosensitivity (Note 2) | Reflection peak (Note 3) | Color of sensitive paper |
|---|---|---|---|---|
| 6 | 780 | 5.3 | 831 | White |
| 7 | 760 | 5.0 | 789 | White |
| 8 | 770 | 5.4 | 842 | White |

(Note 1): Maximum spectroabsorption (nm) in the acetic acid solution.
(Note 2): Exposure (lux/sec) required for reducing the initial potential to half.
(Note 3): Maximum reflection spectral value (nm) of the sensitive paper.

EXAMPLE 3

Two gr of poly-9-vinylcarbazole was dissolved in 15 cc of dioxane, and to this solution was added $1.0 \times 10^{-6}$ moles of Compound No. 6 (of the following structural formula) dissolved in dimethyl sulfoxide to thereby prepare a sensitizing solution.

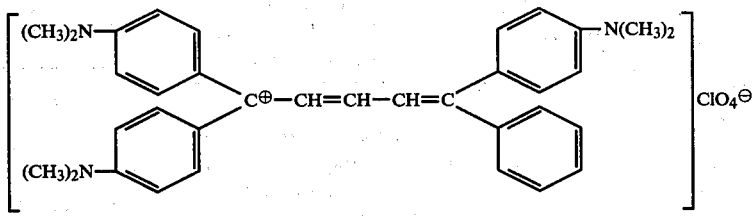

This sensitizing solution was coated on a delustered tracing paper to a thickness of 5μ and dried. The thus obtained sensitive paper was negatively charged, and after attaching fast thereto a positive image on a dry plate, said paper was exposed to a 20-lux infrared lamp by using a photoenlarger and developed with a wet developer to obtain a good picture. The photosensitivity peak of this sensitive paper was shown at 875 nm and substantially no tinting was seen.

The optimum exposure for this paper was 40 lux/sec. This is amazingly low in comparison with the optimum exposure (670 lux/sec) for the comparative sensitive paper prepared similarly by adding the same amount of Malachite Green.

EXAMPLE 4

Two gr of 1,1-bis-(4-N,N-dibenzylaminophenyl)butane, 1.8 gr of polyphenylene oxide resin and 0.3 gr of N,N'-dibenzylbarbituric acid were dissolved in 10 cc of toluene, and to this solution was added $3.0 \times 10^{-6}$ moles of Compound No. 21 dye of the following structural formula to prepare a sensitizing solution.

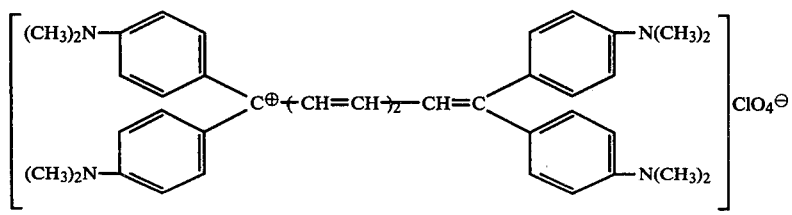

This sensitizing solution was applied on a copper iodide-deposited polyester film to a thickness of 8μ and dried. This film was charged and then exposed and developed in the same way as Example 3 to obtain a good positive image.

The optimum exposure for this film was 210 lux/sec. Maximum absorption of the tested polymethine dye in the ethanol solution was 908 nm and the sensitivity peak of the obtained sensitive paper was seen at 920 nm. This sensitive film was almost colorless and transparent.

EXAMPLE 5

One gr of polycarbonate resin (IUPILON N-3 by Mitsubishi Gas Chemistry), 1 gr of 1,3,5-triphenyl-pyrazoline and 0.12 gr of 3,4-dichlorobenzoylaceto(4-chloro)-anilide were dissolved in 12 cc of ethane dichloride, and to this solution was added $2.0 \times 10^{-6}$ moles of methine dyes of the following general formula dissolved in acetylacetone, thereby to prepare the sensitizing solutions.

Each of these sensitizing solutions was applied, by using a wire round rod, to a quality paper which has been subjected to a solvent-resisting treatment and an electroconductivity treatment, and then dried to obtain a sensitive paper having an approximately 6μ thick sensitized layer.

After adjusting its moisture content, this sensitive paper was charged and exposed by using an electrostatic copying paper tester (by Kawaguchi Electrics), and the initial potential and the exposure required for reducing the initial potential to half were measured and shown in Table 3. The reflection spectrum of said sensitive paper was also measured and its peak value was shown in Table 3.

In this example, there were used five methine dye compounds having the following general formula but differing in $R_1$ and A from each other.

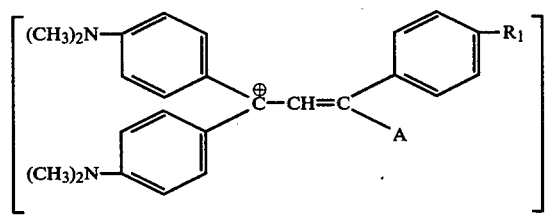

TABLE 3

| Dye No. | $R_1$ | A | $\lambda_{max}$ (Note 1) |
|---|---|---|---|
| 9 | —N(CH$_3$)$_2$ | —⟨phenyl⟩—N(CH$_3$)$_2$ | 645 730 |
| 10 | H | —⟨phenyl⟩ | 635 725 |
| 11 | H | H | 490 660 |
| 12 | —N(CH$_3$)$_2$ | H | 695 |
| 13 | H | -n-C$_4$H$_9$ | 635 805 |

(Note 1): Maximum spectroabsorption (nm) in ethanol solution.

TABLE 3-(2)

| Dye No. | Initial potential (V) | Photosensitivity (Note 2) | Reflection peak (Note 3) | Tint of sensitive paper |
|---|---|---|---|---|
| 9 | 870 | 7.0 | 655 740 | Light azure |
| 10 | 880 | 6.5 | 645 740 | Light azure |
| 11 | 850 | 7.5 | 500 680 | Light brown |
| 12 | 840 | 7.3 | 710 | Colorless |
| 13 | 850 | 10.5 | 650 820 | Light azure |

(Note 2): Exposure (lux/sec) required for reducing initial potential to ½.
(Note 3): Maximum value (nm) on the reflection spectrum of the sensitive paper.

By way of comparison, a similar test was carried out by using the same molar quantity of Crystal Violet of the following structural formula instead of the dyes of this invention, obtaining the results shown below.

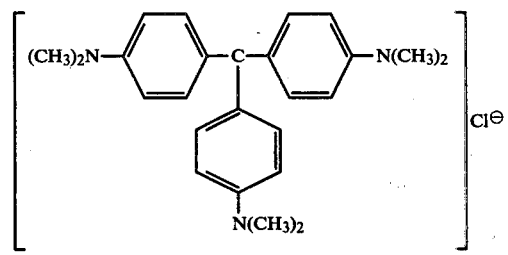

Initial potential: 830 (v)
Photosensitivity: 32 (lux/sec)
Reflection peak: 605 (nm)
Color of sensitive paper: dark blue The results of Table 3 and the comparative example indicate excellent sensitizing performance of the dyes of this invention.

EXAMPLE 6

The sensitive papers obtained in Example 5 were negatively charged by means of corona discharge, and after tightly attaching thereto a positive image on a dry plate, each sensitive paper was exposed to an infrared lamp so that 20-lux illuminance would be given to the sensitive paper surface by using a photoenlarger, and this was followed by development with a wet developer. The optimum exposure time for obtaining a good picture from the above operation was measured for each sensitive paper, obtaining the results shown in Table 4.

TABLE 4

| Sensitive paper No. | Sensitizing dye | Optimum exposure time |
| --- | --- | --- |
| 1 | Dye No. 9 | 2 sec. |
| 2 | Dye No. 10 | 2 sec. |
| 3 | Dye No. 11 | 2.5 sec. |
| 4 | Dye No. 12 | 2.5 sec. |
| 5 | Dye No. 13 | 4.0 sec. |
| cf | Crystal Violet | 12.0 sec. |

It will be seen from the results of Table 4 that the dyes of this invention have more than three times as high sensitizing performance as Crystal Violet which is a typical example of the conventional organic photoconductor dyes.

EXAMPLE 7

One gr of polystyrene resin (Styron 683 by Asahi Dow), 1.1 gr of 3,3-bis-(4-N,N-dibenzylaminophenyl)-pentane and 0.13 gr of 1,3-diethyl-2-thiobarbituric acid were dissolved in 13 cc of toluene, and to this solution was added $4.0 \times 10^{-6}$ moles of methine dyes of the following general formula dissolved in acetylacetone, thereby preparing the sensitizing solutions. By using these solutions, there were obtained the sensitive papers having an approximately 6μ thick sensitive layer in the same way as Example 1, and their properties were determined after the manner of Example 5, obtaining the results shown in Table 5.

In this example, there were used three methine dyes having the following general formula but differing in B and X from one another as shown in Table 5.

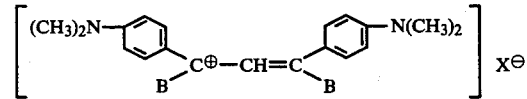

TABLE 5-(1)

| Dye No. | B | X | λ_max (Note 1) |
| --- | --- | --- | --- |
| 14 | —CH₃ | ClO₄ | 695 |
| 15 | —C₆H₅ (phenyl) | ClO₄ | 755 490 |
| 16 | —C₆H₅ (phenyl) | CH₃—C₆H₄—SO₃ | 755 495 |

Note 1: Maximum value of spectroabsorption in ethanol solution (nm).

TABLE 5-(2)

| Dye No. | Initial potential (V) | Photosensitivity (Note 2) | Reflection peak (Note 3) | Color of sensitive paper |
| --- | --- | --- | --- | --- |
| 14 | 780 | 7.8 | 710 | White |
| 15 | 790 | 5.5 | 763 | Faint pink |
| 16 | 770 | 6.5 | 782 | Faint pink |

Note 2: Exposure (lux/sec) required for reducing the initial potential to half.
Note 3: Maximum value (nm) on reflection spectrum of the sensitive paper.

EXAMPLE 8

Each of the sensitive papers obtained in Example 7 was negatively charged by means of corona discharge, and after tightly attaching thereto a positive image on a dry plate, each sensitive paper was exposed by using a photoenlarger while using as light source a tungsten lamp so set as to give 50 lux illumination on the sensitive paper surface, followed by development with a wet developer, and the optimum exposure time for obtaining a good picture was measured, obtaining the results shown in Table 6. For the purpose of comparison, a similar test was conducted by using the same molar quantity of Victoria Blue B (of the following structural formula) instead of the dyes of this invention, the results of which are also shown in Table 6.

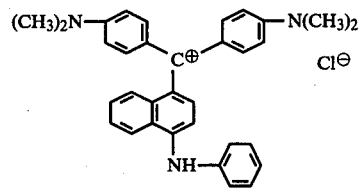

TABLE 6

| Sensitive paper No. | Sensitizing dye | Optimum exposure time |
| --- | --- | --- |
| 6 | Dye No. 14 | 0.8 sec. |
| 7 | Dye No. 15 | 0.5 sec. |
| 8 | Dye No. 16 | 0.8 sec. |
| cf | Victoria Blue B | 3.0 sec. |

The results of Table 6 show that the dyes of this invention are more than 4 times higher in sensitizing performance than Victoria Blue B which is a well-known organic semiphotoconductor dye.

EXAMPLE 9

Two gr of poly-9-vinylcarbazole was dissolved in 15 cc of dioxane, and to this solution was added $1.5 \times 10^{-6}$ moles of a dye of this invention (Compound No. 16) of the following structural formula dissolved in dimethylformamide to prepare a sensitizing solution.

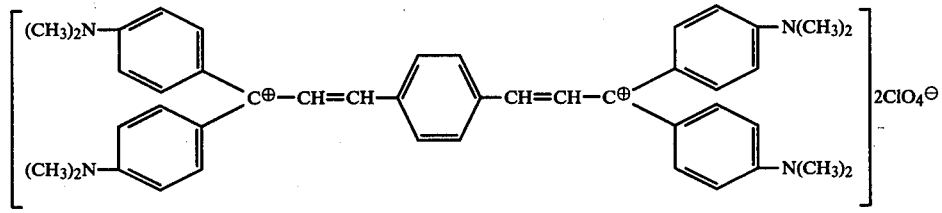

This sensitizing solution was applied on a lustered tracing paper to a thickness of 5μ and dried. The obtained sensitive paper was negatively charged, and with a positive image on a dry plate being tightly attached thereto, said paper was exposed to a 30 lux infrared lamp by using a photographic enlarger and then developed with a wet developer to obtain a good picture. The photosensitivity peak of this sensitive paper was 650 nm, and the paper was tinted in light azure.

The optimum exposure for this sensitive paper was 45 lux/sec while the optimum exposure for the comparative sensitive paper prepared by using the same amount of Malachite Green instead of the dye of this invention was 250 lux/sec.

EXAMPLE 10

Two gr of 1,1-bis-(4-N,N-dibenzylaminophenyl)butane, 1,8 gr of polyphenylene oxide resin and 0.35 gr of 3,5-dichlorobenzoylaceto-(4'-trichloromethylaniline) were dissolved in 15 cc of toluene, and to this solution was added $5.0 \times 10^{-6}$ moles of Compound No. 30 dye of this invention (having the following structural formula) to prepare a sensitizing solution.

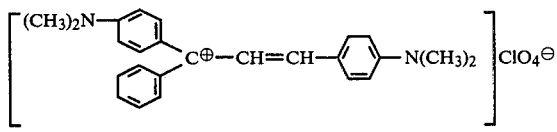

This sensitizing solution was coated on a copper iodide-deposited polyester film to a thickness of 8μ and dried. The obtained film was charged and then exposed and developed in the same way as Example 9 to obtain a good positive image.

The optimum exposure for this film was 180 lux/sec. The maximum absorption of this methine dye in an ethanol solution was 714 nm and the photosensitivity of the sensitive film was 725 nm. Any color was hardly perceivable on the visible portion of this sensitized film and it was substantially colorless and transparent.

EXAMPLE 11

0.8 gr of polycarbonate resin (IUPILON N-3 by Mitsubishi Gas Chemistry), 1.0 gr of 2,2-bis-(4-N,N-dibenzylaminophenyl)-butane and 0.12 gr of N,N'-diethyl-2-thiobarbuturic acid were dissolved in 10 cc of monochlorobenzene, and to this solution was added $2.0 \times 10^{-6}$ moles of polymethine dyes of the following general formula dissolved in acetylacetone to prepare sensitizing solutions.

Each of these sensitizing solutions was applied on an aluminum dyed Mylar by using a wire round rod and dried to prepare an electrophotographic sensitive medium having an approximately 6μ thick sensitive layer. Thereafter, this sensitive medium was subjected to 6 KV positive or negative corona discharge according to a known electrophotographic copying method to give the electric charges and then exposed to a 20-lux light source. The initial potential and the exposure required for halving the initial potential were measured and shown in Table 7.

Used in this example were five polymethine dyes having the following general formula but differing in R from one another as shown in Table 7.

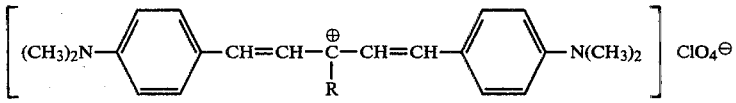

TABLE 7-(1)

| Dye No. | Compounds used No. | R | $\lambda_{max}$ (Note 1) | Melting point (°C.) |
|---|---|---|---|---|
| 17 | Compound No. 50 | H | 790 | 168–170 |
| 18 | No. 52 | —⟨phenyl⟩ | 817 | 179–182 |
| 19 | No. 54 | —CH=CH—⟨phenyl⟩ | 832 | 181–183 |
| 20 | No. 55 | —⟨phenyl⟩—N(CH₃)₂ | 771 | 148–151 |
| 21 | No. 64 | —C₂H₅ | 788 | 133–135 |

TABLE 7-(2)

| Dye No. | Initial potential (V) | Photosensitivity (Note 2) | Reflection peak (Note 3) | Film tint |
|---|---|---|---|---|
| 17 | 980 | 35 | 805 | Colorless, transparent |
| 18 | 1100 | 15 | 830 | Colorless, transparent |
| 19 | 1050 | 18 | 845 | Colorless, transparent |
| 20 | 1000 | 20 | 785 | Light green |
| 21 | 1050 | 22 | 800 | Colorless, transparent |

Note 1: Maximum value of spectroabsorption in ethanol solution. However, the value for Dye No. 17 is maximum spectroabsorption in acetylacetone solution.
Note 2: Exposure (lux/sec) required for reducing the initial potential to half.

By way of comparison, a similar test was conducted by using the same molar quantity of Crystal Violet (having the following structural formula), which is a typical known sensitizing dye, instead of the dyes of this invention, obtaining the results shown below.

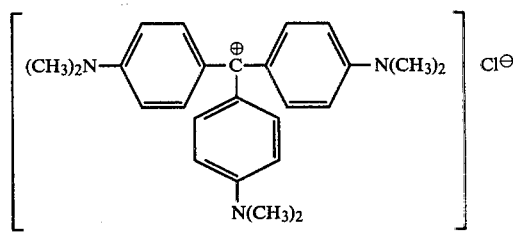

Initial potential: 1,120 (v)
Photosensitivity: 45 (lux/sec)
Reflection peak: 605 (nm)
Color tone of sensitive film: Dark blue The foregoing results are indicative of excellent sensitizability of the sensitizing dyes according to this invention.

EXAMPLE 12

One gr of polystyrene resin (Styron 685 by Asahi Dow), 1 gr of 1,5-diphenyl-3-styryl-pyrazoline and 0.12 gr of 3,5-dichlorobenzoylaceto-4'-trichloromethylanilide were dissolved in 12 cc of toluene, and to this solution was added $1.5 \times 10^{-6}$ moles of polymethine dyes of the following general formula dissolved in acetylacetone, thereby preparing sensitizing solutions.

Each of these sensitizing solutions was applied, by using a wire round rod, to a quality paper which has been subjected to an electroconductive treatment, and then dried to obtain a sensitive paper having an approximately 6μ thick sensitive layer. After moisture content adjustment, this sensitive paper was charged and exposed by using an electrostatic copying paper tester (by Kawaguchi Electrics), and the initial potential and the exposure required for reducing the initial potential to half were measured and shown in Table 8. Reflection spectrum of this sensitive paper was also measured and its peak value was also shown in Table 8.

The polymethine dyes used in this example were those represented by the following general formula but differing in A from each other as shown in Table 8.

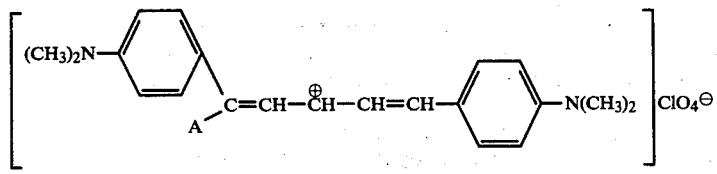

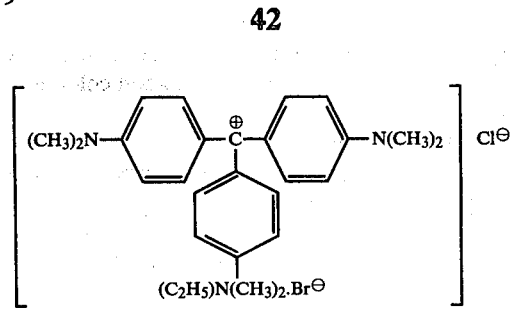

Initial potential: 880 (v)
Photosensitivity: 25 (lux/sec)
Reflection peak: 605 (nm)
Tint of sensitive paper: deep blue Excellent sensitizability of the dyes of this invention is apparent from the results of Table 8 and the comparative example.

EXAMPLE 13

Each of the sensitive papers obtained in Example 12 was electrically charged, and after tightly attaching thereto a positive film, said paper was exposed by using as light source an infrared lamp placed approximately 30 cm away from the sensitive paper, and then developed with liquid toner to form a clear copied image faithful to the original. The optimum exposure (lux/sec) for obtaining such clear copied image was as shown below.

| Sensitive paper No. | Sensitizing dyes used | Optimum exposure |
|---|---|---|
| 9 | Dye No. 22 | 20 |
| 10 | Dye No. 23 | 25 |
| 11 | Dye No. 24 | 20 |
| 12 | Ethyl Green | 45 |

TABLE 8-(1)

| Dye No. | Compounds used | A | $\lambda_{max}$ (Note 1) | Melting point (°C.) |
|---|---|---|---|---|
| 22 | Compound No. 51 | —C₆H₅ | 812 | 161 (dec) |
| 23 | Compound No. 56 | —C₆H₄—N(CH₃)₂ | 691 | 178–181 |
| 24 | Compound No. 62 | —CH₃ | 794 | 156–158 |

TABLE 8-(2)

| Dye No. | Initial potential (V) | Photosensitivity (Note 2) | Reflection peak (Note 3) | Tint of sensitive paper |
|---|---|---|---|---|
| 22 | 850 | 8 | 825 | Light yellow |
| 23 | 870 | 12 | 715 | Light yellowish green |
| 24 | 840 | 8 | 810 | Light yellow |

(Note 1): Maximum value of spectroabsorption in ethanol solution (nm).
(Note 2): Exposure (lux/sec) required for reducing the initial potential to half.
(Note 3): Maximum value (nm) on reflection spectrum of sensitive paper For the purpose of comparison, a similar test was carried out by adding the same molar quantity of Ethyl Green (of the following structural formula), which is a typical known sensitizing dye, instead of the dyes of this invention, obtaining the results shown below.

EXAMPLE 14

Two gr of bis-(4-N,N-dibenzylaminophenyl)methane, 1.2 gr of polycarbonate resin (IUPILON N-3 by Mitsubishi Gas Chemistry), 0.2 gr of N,N'-diethyl-2-thiobarbituric acid and 0.2 gr of 1,5-diphenyl-2-(p-methoxyphenyl)-pyrazoline were dissolved in 20 cc of monochlorobenzene, and to this solution was added $3.0 \times 10^{-6}$ moles of a polymethine dye (Compound No. 51) dissolved in acetylacetone to prepare a sensitizing solution. This sensitizing solution was applied on an aluminum deposited Mylar by using a wire round rod and then dried to obtain an electrophotographic sensitive medium having an approximately 7μ thick sensitive layer.

This film was electrically charged and then exposed and developed in the same way as Example 3 to obtain a good positive image. The optimum exposure was 150 lux/sec.

The maximum absorption of this polymethine dye in ethanol solution was 812 nm and the sensitivity peak of this sensitive film was 825 nm. This sensitive film was slightly tinted in yellow, but it was almost colorless and transparent.

What is claimed is:

1. An electrophotographic photosensitive material comprising a support and thereon a layer of an organic photoconductor and a layer of sensitizing compound or a layer of a mixture thereof, the organic photoconductor selected from the group consisting of aromatic tertiary amino compound, aromatic tertiary diamino compound, a condensation product, metal-containing compound, heterocyclic compound and mixtures thereof, and the sensitizing compound having the following formula;

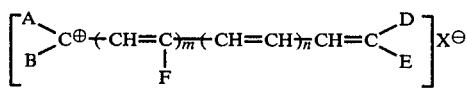

wherein A, B, D and E represent independently a hydrogen atom, an alkyl group having 1 to 4 carbon atoms, a phenyl group or a 5- or 6-membered heterocyclic ring residue, and at least two of them represent a phenyl group; F is an alkyl, phenyl or styryl group; m is a number of 0 or 1, and n is a number of zero 1 or 2, provided that when m is 1, n is 0; and $X^-$ represents an anion residue.

2. The electrophotographic photosensitive material of claim 1, wherein the compound is represented by the formula:

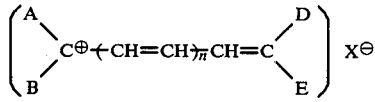

wherein A, B, D, E, n and $X^\theta$ are as defined above, and at least two of A, B, D and E represent a phenyl group substituted for an amino group.

3. The electrophotographic photosensitive material of claim 2, wherein all of the A, B, D and E are phenyl groups substituted with an amino group.

4. The electrophotographic photosensitive material of claim 1, 2 or 3, wherein the amino group is represented by the formula

where $R_3$ and $R_4$ represent respectively hydrogen atom, an alkyl group or a benzyl group.

5. The electrophotographic photosensitive material of claim 2, wherein the compound is represented by the formula,

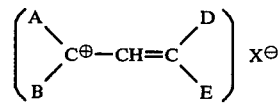

wherein A, B, D and E are independently a hydrogen atom, a $C_1$-$C_4$ alkyl, a phenyl group, a substituted phenyl group, or a heterocyclic ring residue, and at least two of them are phenyl groups substituted with an amino group and $X^\theta$ is an anion residue.

6. The electrophotographic photosensitive material of claim 5, wherein at least two phenyl groups each substituted with an amino group are represented by the formula:

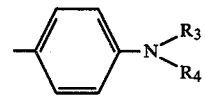

wherein $R_3$ and $R_4$ are same as defined in claim 4.

7. The electrophotographic photosensitive material of claim 1, wherein the layer of the organic photoconductor is provided on the support and the layer of the sensitizing compound is provided on the layer of the organic photoconductor.

8. An electrophotographic photosensitive material of claim 1, wherein the compound is represented by the formula:

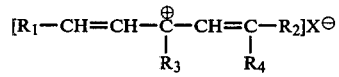

wherein
$R_1$ and $R_2$ are independently a phenyl group which may be substituted with a halogen atom, an alkoxy group or a group of the formula:

wherein $R_6$ and $R_7$ are independently a hydrogen atom, an alkyl group or a benzyl group at the para-position; $R_3$ is a hydrogen atom, an alkyl group, a phenyl or substituted phenyl group, or a styryl group; $R_4$ is a hydrogen atom, an alkyl group or a phenyl or substituted phenyl group and at least two of $R_1$, $R_2$, $R_3$ and $R_4$ represent a phenyl group substituted with an amino group; and $X^\theta$ is an anion residue.

* * * * *

UNITED STATES PATENT AND TRADEMARK OFFICE
CERTIFICATE OF CORRECTION

PATENT NO. : 4,387,149
DATED : June 7, 1983
INVENTOR(S) : EMOTO, et al

It is certified that error appears in the above-identified patent and that said Letters Patent are hereby corrected as shown below:

Correct the patent to have claim 1 read as follows:

1. An electrophotographic photosensitive material comprising a support and thereon a layer of an organic photoconductor and a layer of sensitizing compound or a layer of a mixture thereof, the organic photoconductor selected from the group consisting of an aromatic tertiary amino compound, an aromatic tertiary diamino compound, an aromatic tertiary triamino compound, a polyvinyl carbazole compound, a condensation product, a metal-containing compound, heterocyclic compound and mixtures thereof, and the sensitizing compound having the following formula:

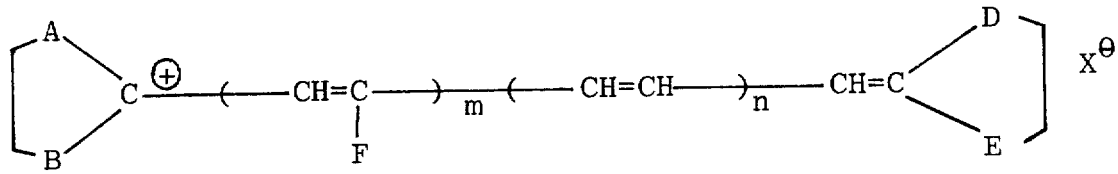

UNITED STATES PATENT AND TRADEMARK OFFICE
CERTIFICATE OF CORRECTION

PATENT NO. : 4,387,149

DATED : June 7, 1983

INVENTOR(S) : EMOTO, et al

It is certified that error appears in the above–identified patent and that said Letters Patent are hereby corrected as shown below:

wherein A, B, D and E represent independently a hydrogen atom, an alkyl group having 1 to 4 carbon atoms, a phenyl group, a substituted phenyl group, or 5- or 6-membered heterocyclic ring residue, and at least two of them represent a phenyl group substituted with an amino group; F is an alkyl, phenyl or styryl group; m is a number of 0 or 1, and n is a number of zero, 1 or 2, provided that when m is 1, n is 0; and $X^-$ represents an anion residue.

Signed and Sealed this

Twenty-ninth Day of November 1983

[SEAL]

Attest:

GERALD J. MOSSINGHOFF

Attesting Officer

Commissioner of Patents and Trademarks